SHARP EDGED ORIFICE

ROUND EDGED ORIFICE

STRAIGHT TAPERED CONVERGING SECTION

*INVENTORS*
*H. G. Gibson*
*G. E. Fasching*
*D. E. Bluman*

ATTORNEYS

United States Patent Office 3,408,866
Patented Nov. 5, 1968

3,408,866
FLOWMETER FOR GAS-SOLIDS SUSPENSIONS
Harry G. Gibson, George E. Fasching, and Dean E. Bluman, Morgantown, W. Va., assignors to the United States of America as represented by the Secretary of the Interior
Filed Oct. 7, 1966, Ser. No. 586,006
9 Claims. (Cl. 73—228)

ABSTRACT OF THE DISCLOSURE

A flowmeter adapted to measure the flowrate of a gas-solids mixture passing through a conduit comprising a construction in the conduit to produce an area of low pressure and an area of diverging solids, means to measure the pressure differential between said low-pressure area and normal pressure, a target positioned within the area of diverging solids such that essentially all the solids strike the target, and means to measure the pressure exerted by said solids on the target.

This invention relates to flowmeters. More specifically, it relates to a device for simultaneously measuring the flowrate of a gas stream and the concentration and flowrate of solid or liquid particles suspended in that stream.

The measurement of two-phase flow is of great importance in the handling of cement, coal, catalyst, and grain suspensions as well as in the utilization of two-phase heat exchange mediums. Standard types of flow nozzles and orifices experience plugging of the pressure tap holes by the carried phase. It has been suggested that to measure the flowrate of two-phase systems target-type flowmeters be used such as disclosed in U.S. Patents 2,742,784 to Brous and 2,826,914 to Reiley. These meters however suffer the disadvantage of inaccuracy due to the tendency of a large number of small suspended particles to flow around the target rather than striking it. More recently, it has been proposed to measure entrained solid flowrates with fiber-optic probes.[1] However, these probes are difficult to use as the data generated by them cannot be readily reduced to a meaningful measurement. Furthermore, they measure only the carried phase.

Thus, there remains in the art a need for a simple and efficient device to measure flowrate in two-phase systems.

Accordingly, it is an object of this invention to provide a simple and efficient apparatus adapted to simultaneously measure the flowrate of a gas stream as well as the concentration and flowrate of particles suspended in the gas stream.

A further object of this invention is to provide an apparatus which will measure the solids flowrate of a gas-solid mixture without the necessity of separating any solids from the gas.

It is a further object of this invention to provide an improved target-type apparatus for measuring the flowrate of two-phase systems.

Still further, it is an object of this invention to provide a combination venturi and target-type flowmeter for measuring the concentration and flowrate of particles suspended in a gaseous medium.

Still other objects and advantages of this invention will become apparent from the following description wherein reference is made to the figures of the accompanying drawings in which.

Figure 5:
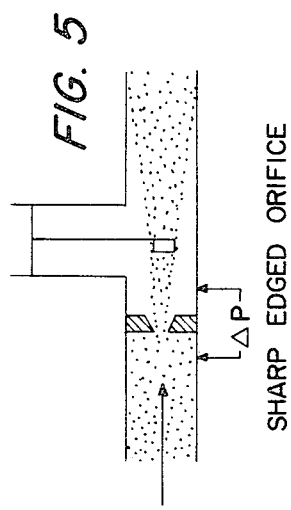
Figure 6:
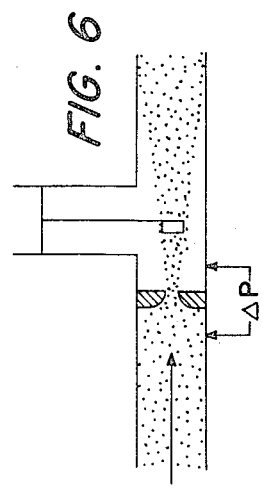
Figure 7:
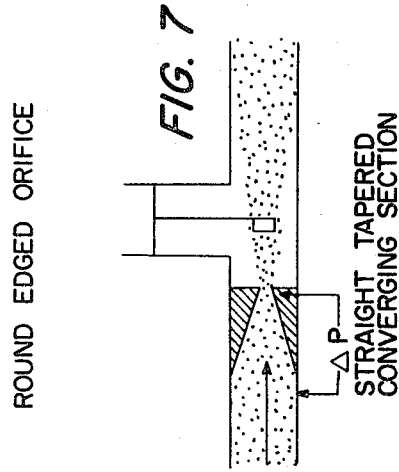

FIGS. 5, 6 and 7 schematically illustrate the various types of nozzles which may be used in the present invention.

Figure 1:
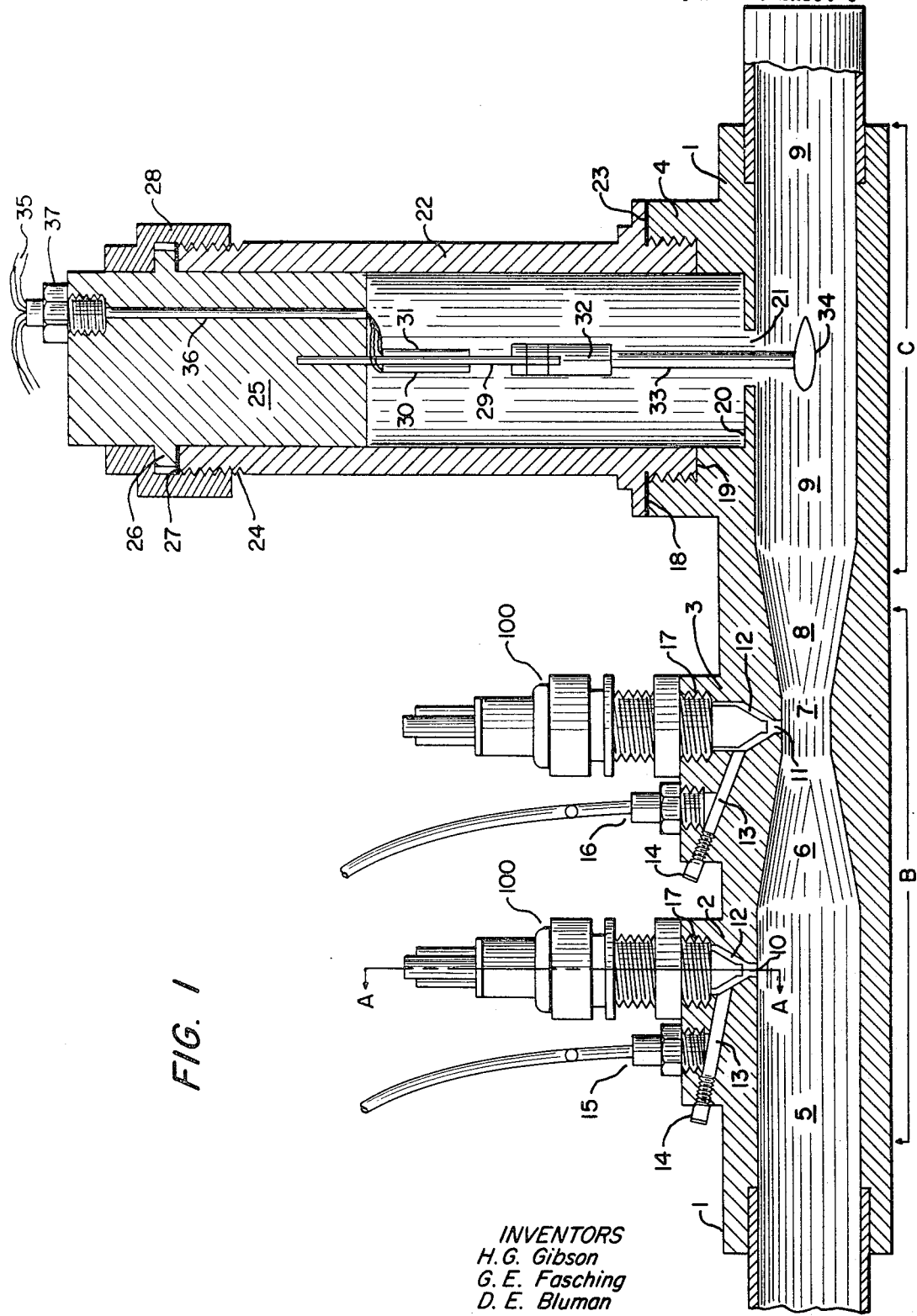
FIG. 1 is an elevational view partly in cross-section showing an apparatus according to the present invention.

Referring now to FIG. 1, the flowmeter as illustrated includes a venturi portion B and a cantilevered rod, or target portion C. Connecting these two sections of the apparatus and extending the entire length thereof is hollow housing 1 which has positioned thereon external mounting blocks 2 and 3 and external flange 4. The interior of housing 1 is of circular cross-section. The cross-sectional diameter is varied within venturi portion B to form a constant diameter portion 5, a converging portion 6, a throat 7, and a diverging portion 8, whereas section 9 of housing 1 within cantilever beam portion C of the apparatus remains of constant cross-section, the diameter generally being equal to that of section 5. An opening or port 10 is made in constant diameter portion 5 of housing 1 opposite mounting block 2. A like opening 11 is made in throat portion 7 of housing 1 opposite mounting block 3. Each of these openings leads to a chamber 12 which is formed within the respective mounting blocks. In turn, chambers 12 communicate with ducts 13 which extend from chambers 12 to the exterior of blocks 2 and 3 where they are stopped by plugs 14 which are threadedly engaged in mounting blocks 2 and 3. Also threadedly engaged in blocks 2 and 3 are pressure signal lines 15 and 16 respectively. These lines are positioned within the mounting blocks so as to communicate with ducts 13 and therefore ultimately continuously communicating by way of chambers 12 to the interior of housing 1. Chambers 12 extend upwardly to the exterior of blocks 2 and 3 and have at their ends threaded portions 17. Positioned within each threaded portion 17 is a valve unit 100 which includes slidably mounted plug 150 which can be moved by operating valves 100 to close ports 10 and 11.

Figure 2:
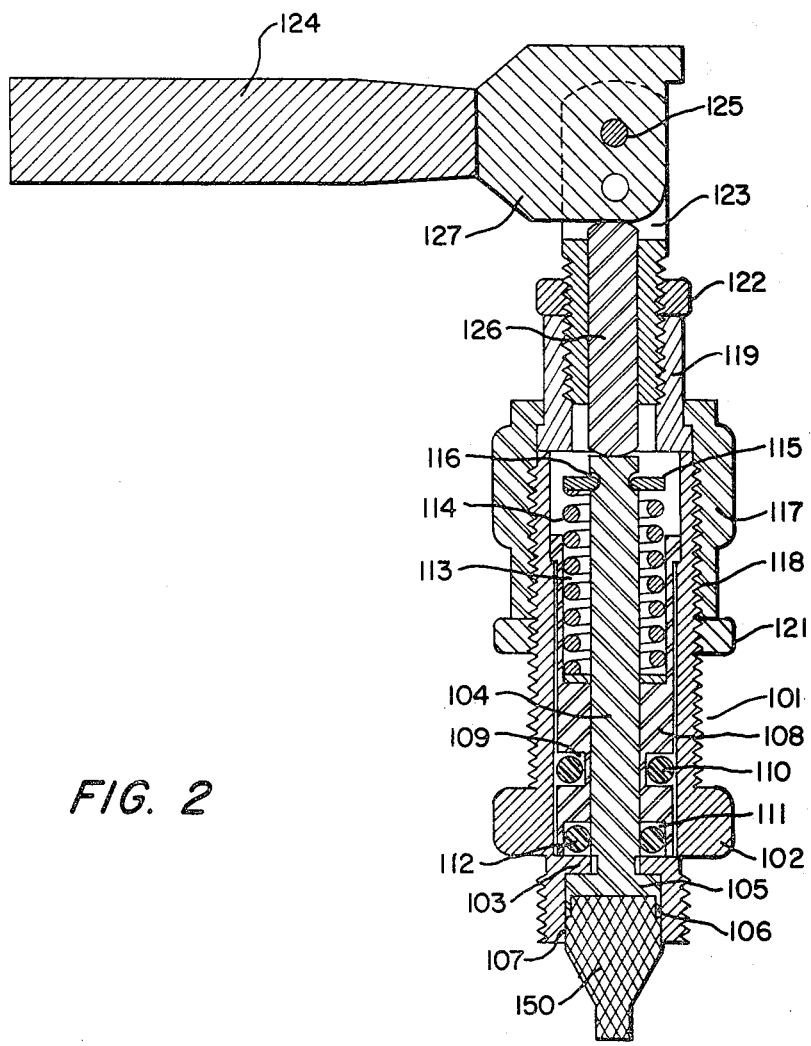
FIG. 2 is a cross-section along A—A of FIG. 1 showing the detail of valves 100 of that figure.

Structure and operation of valves 100 are more fully understood when reference is made to FIG. 2 of the drawings. In that figure, valve 100 is shown as comprising a hollow body member 101 externally threaded on each end and having an external collar 102 intermediate said threaded portions and having a constriction 103 near its lower end. Positioned within body member 101 is a solid generally cylindrical valve stem 104. Valve stem 104 is concentric with body member 101 and is of such a diameter as to pass through constriction 103 in body member 101. The end 105 of valve stem 104 which extends through constriction 103 in member 101 is of expanded diameter and has lip portion 106 which holds a Teflon plug 150 so that plug 150 remains slidably fitted to the internal surface 107 of the lower end of body member 101. A hollow insert 108 seals valve stem 104 within body member 101 and keeps it in concentric relationship thereto. This insert is grooved at 109 to receive O-ring 110 which provides a seal between insert 108 and body member 101 and also has a hollow portion 111 at its lower end which abuts constricted portion 103 of body member 101 and which provides access for O-ring 112 which provides a seal between insert 108 and valve stem 104. The upper end of insert 108 has a hollow portion 113. A spring 114 is placed around valve stem 104 within this hollow portion and is held compressed between insert 108 and a ring 115 which is fitted within groove 116 in valve stem 104. Held tightly on the upper end of body member 101 by cap 117 which is turned on external

---

[1] R. L. Peskin and H. A. Dwyer, "A Study of the Mean Flow Characteristics of Gas-Solid Suspensions," Technical Report No. 101–ME–F, Division of Reactor Development, United States Atomic Energy Commission, February 1964, ASME Paper No. 65–WA–FE–24.

threads 118 of body member 101 is an internally threaded hollow neck portion 119 through which ring 115 will not pass and into which is threaded a hollow bushing 120. A lock nut 121 is drawn up on threads 118 to secure cap 117 and a like lock nut 122 is drawn down on the threads of bushing 120 and abuts against the upper portion of neck 119. Bushing 120 has a slotted head portion 123 to which a handle 124 is rotatably mounted about pivot 125. Within bushing 120 there is slidably positioned a solid link pin 126 which is tightly held between a cammed surface 127 of handle 124 and the upper end of valve stem 104.

In operation, Teflon plug 150 is made to close opening or port 10 (FIG. 1), when handle 124 is the down position which forces link pin 126 downwardly and thus in turn forcing valve stem 104 downwardly and ultimately closing port 10 with plug 150. The ports are opened by moving the handle to the up position thereby allowing the compressive forces of spring 114 to move valve stem 104 and link pin 126 upwardly and thus withdrawing plug 150 from ports 10 or 11.

Returning now to FIG. 1, the cantilevered beam portion C of the flowmeter is shown as comprising a constant diameter section 9 of housing 1 which communicates with divergent portion 8. Housing 1 in part C also includes internally threaded circular flange 4 having an upper face 18, shoulders 19 and 20 and an opening 21. Threaded within flange 4 and abutting face 18 and shoulder 19 is cylindrical housing 22. Face 18 of flange 4 and housing 22 are sealed by gasket 23. The top of cylindrical housing 22 is threaded externally at 24. Fitted within the upper part of housing 22 and extending downwardly therein is a plug 25. This plug includes a collar portion 26, which is sealed to the top of housing 22 by gasket 27 and is held tightly thereon by cap 28 which is turned on threads 24. Firmly embedded in the center and bottom of plug 25 is a downwardly extending cantilever rod 29 to which is attached a pair of strain gages 30 and 31. This cantilevered rod is attached to an enlarged portion 32. Extending down from enlarged portion 32 is arm 33 which passes through opening 21 and to which is connected target 34.

Signal leads 35 from strain gages 30 and 31 are passed through channel 36 in plug 25. In the upper end of this channel there is threadedly engaged a pressure seal fitting 37. Signal leads 35 feed the output from the strain gages 30 and 31 to the balancing circuit which is shown in FIG. 3.

Figure 3:
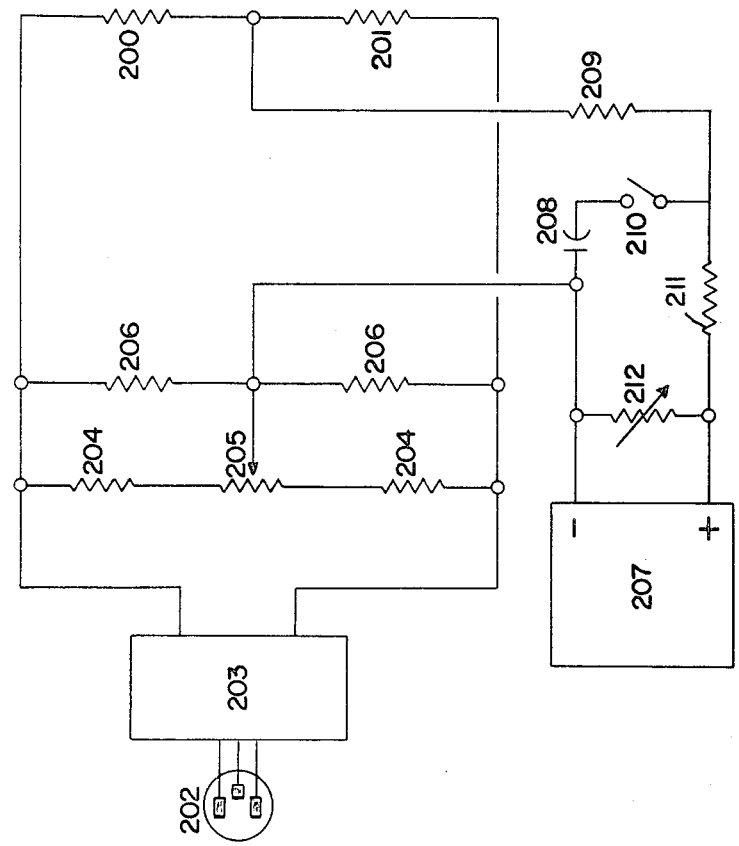
FIG. 3 is a schematic drawing illustrating the bridge circuit used to record the response from target 34 of FIG. 1.

In FIG. 3 strain gages 30 and 31 of FIG. 1 are represented as resistances 200 and 201. These resistances form the balance arms of a bridge circuit in which 202 is a line plug, and 203 is a line operated D.C. power supply, across which is positioned zero control divider resistors 204 with zero control 205, two bridge reference resistors 206 and strain gage resistances 200 and 201. The output of the bridge circuit leads to a potentiometric type strip chart recorder 207 through a control circuit which features filter capacitor 208, a filter attenuator resistor 209, switch 210, attenuator resistor 211, and a range control 212.

Figure 4:
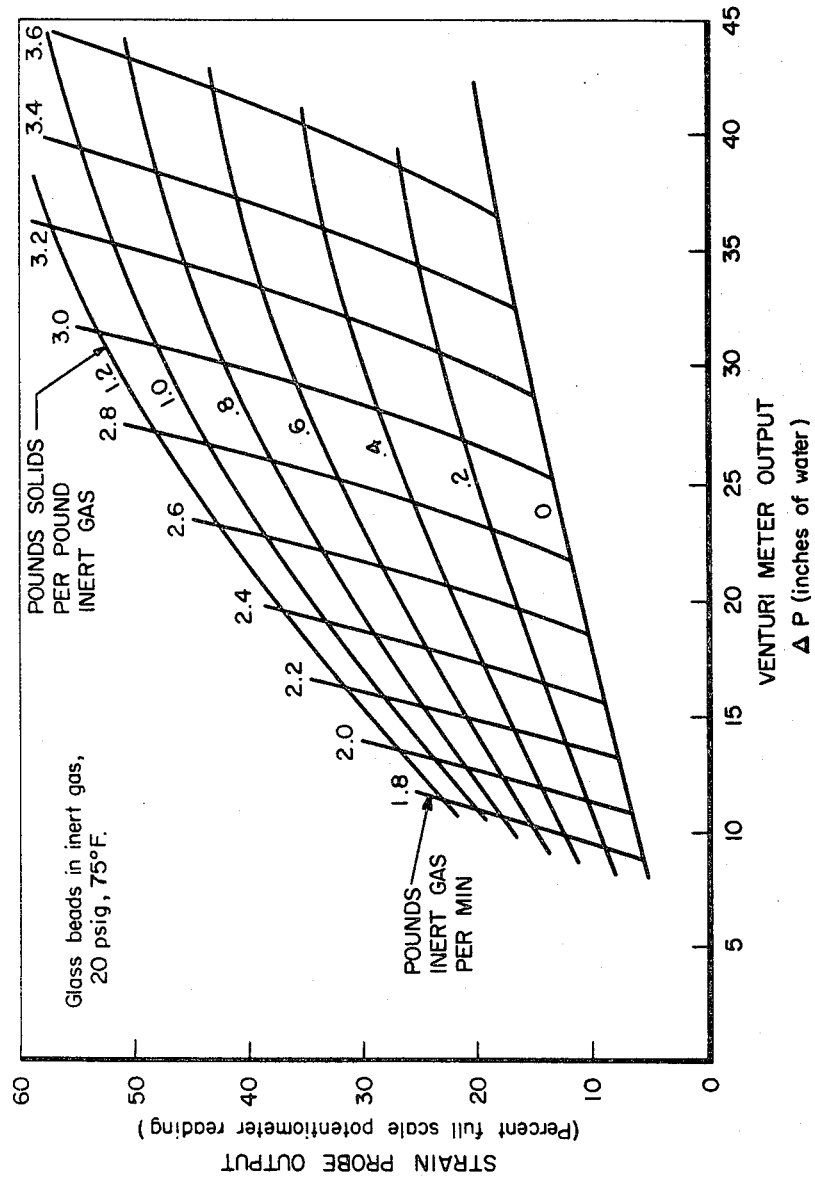
FIG. 4 shows a typical calibration curve generated by the present apparatus.

To operate the flowmeter, it must first be calibrated for the type of suspension with which it will be used. To calibrate the instrument the gas and solids rates are metered separately and the results of the output are correlated as shown in FIG. 4. The flow of gas through housing 1 causes a pressure differential between portion 5 and portion 7 of housing 1. When solids are present in addition to gas, the solids are forced into an area of restricted diameter as they pass through portion 7 of 1. Having a larger mass than the gas molecules, these solid particles are slower in diverging after passage through the constriction and thus are forced to impinge upon target 34 causing arm 33 to flex and thus changing the resistances of the strain gages and creating a meter reading on potentiometer 207. These separate readings, the pressure drop and the potentiometer reading, may be taken for different combinations of gas and solid flowrates for a particular type of suspension, and the results when plotted as in FIG. 4 represent a calibration curve. After calibration, the meter may be placed in a suspension carrying line. Measurements are taken of both the venturi and target section. These measurements are then correlated with the calibration curve for that type of suspension with the result that both the gas phase flowrate and solid phase flowrate may be determined simultaneously.

An important advantage is gained in the present flowmeter by positioning the target immediately after the venturi. It is that essentially all of the solids will hit the target because they will be concentrated in the center of the conduit (portion 9, FIG. 1). In this respect, the target should be positioned very close to the throat of venturi but not any closer than a distance equal to one-half times the unrestricted tube diameter.

It is this unique cooperation between the nozzle portion and target portion of the apparatus which not only allows for separate flowrate measurements for each phase, but which also accounts for the excellent response and accurateness of the instrument.

It should be noted that it is not necessary that the nozzle portion of the apparatus assume the conventional venturi shape shown in FIG. 1. FIGS. 5, 6, and 7 show alternative nozzle designs which serve to collect the solids in the center of the flowmeter conduit and also cause a pressure drop from which the gas flowrate may be calculated.

FIG. 5 shows the use of a sharp-edged orifice.

FIG. 6 shows the use of a round-edged orifice, and

FIG. 7 shows the use of a straight tapered converging section. The arrowheads on these schematic drawings illustrate the location of the pressure taps.

The target may also very in shape being either a football shape such as shown in FIG. 1, a flat round disc, such as shown in U.S. Patent 2,742,784 to J. C. Brous, or a rectangular strip. When the target is the shape of a football or a round disc, it is preferable that its diameter be from about 0.5 to 0.9 of the non-constricted diameter of the tube within the flowmeter.

Furthermore, the means to measure the pressure exerted on the target need not be of an electrical circuit responsive to the output of strain gages but may comprise a system responsive to mechanical movement such as that described in U.S. Patent 2,742,784 to Brous. The use of strain gages, however, is the preferred mode of practicing the invention.

As will be appreciated by one skilled in the art, the present meter will serve many useful functions. For example, besides being used as a meter, the present device may be used as a pneumatic transport control device for controlling the flow of materials such as coal, flour, cement, chemicals, grain and powdered metals. Furthermore, the apparatus may be used as a quality control device to control and monitor the metering of a predetermined amount of solids into a gas stream such as where powdered coal is fed to a blast furnace in the form of a slurry.

Still other substitutions, alterations and omissions are possible without departing from the spirit or scope of the present invention which is distinctly defined and clearly claimed hereinbelow.

What is claimed is:

1. A flowmeter for measuring the flowrate of the gas and solid phases of a gas-solids mixture which comprises,
   (a) an elongated conduit;
   (b) a constriction located in said conduit, such that when a gas-solids mixture is passed through said conduit an area of low pressure occurs and an area of diverging solids is created downstream of said constriction;
   (c) pressure measuring means located at the locus of said low pressure;

(d) pressure measuring means located upstream of said constriction;

(e) a target having a cross-sectional diameter of from about 0.5 to 0.9 of the non-constricted diameter of the conduit, said target located within said conduit downstream from said constriction and within said area of diverging solids at a distance of at least 0.5 the non-constricted diameter of said conduit from said constriction such that substantially all of said solids strike said target; and (f) means to measure the force exerted on said target.

2. The apparatus of claim 1 wherein the target is suspended within said conduit from a cantilever beam and the means for measuring the force exerted on said target comprises a pair of strain gages mounted on said cantilever beam.

3. The apparatus of claim 2 further comprising means to record the resistances of said strain gages.

4. The apparatus of claim 3 wherein the constriction comprises a venturi.

5. The apparatus of claim 3 wherein the constriction comprises a cylindrical insert having therein a longitudinal axial truncated conical passage.

6. The apparatus of claim 5 wherein the smaller end of said passage is located on the downstream side of said insert.

7. The apparatus of claim 3 wherein the constriction comprises a traversely mounted plate, said plate having centrally positioned therein an orifice and said orifice being formed with smooth surfaces on the upstream side.

8. The apparatus of claim 3 wherein the target is an extended elliptical solid of revolution.

9. The apparatus of claim 3 wherein the target is a flat disc.

References Cited
UNITED STATES PATENTS

| | | | |
|---|---|---|---|
| 720,188 | 2/1903 | Seidener | 73—194 |
| 2,127,501 | 8/1938 | Dall | 73—211 |
| 2,742,784 | 4/1956 | Brous | 73—228 |
| 2,772,567 | 12/1956 | Boden et al. | |
| 2,826,914 | 3/1958 | Reiley | 73—228 |
| 2,842,962 | 7/1958 | Dall | 73—213 X |
| 3,073,158 | 1/1963 | Knauth | 73—213 X |
| 3,115,777 | 12/1963 | Hochreiter | 73—228 X |

RICHARD C. QUEISSER, *Primary Examiner.*

E. D. GILHOOLY, *Assistant Examiner.*